(12) United States Patent
Chilton et al.

(10) Patent No.: US 9,897,005 B2
(45) Date of Patent: Feb. 20, 2018

(54) OIL DISTRIBUTOR

(71) Applicant: ROLLS-ROYCE PLC, London (GB)

(72) Inventors: Nicholas E. Chilton, Derby (GB); Michael J. Barker, Nottingham (GB)

(73) Assignee: ROLLS-ROYCE plc, London (GB)

( * ) Notice: Subject to any disclaimer, the term of this patent is extended or adjusted under 35 U.S.C. 154(b) by 224 days.

(21) Appl. No.: 14/924,176

(22) Filed: Oct. 27, 2015

(65) Prior Publication Data

US 2016/0131034 A1 May 12, 2016

(30) Foreign Application Priority Data

Nov. 6, 2014 (GB) .................................. 1419770.1

(51) Int. Cl.
| | |
|---|---|
| F02C 7/06 | (2006.01) |
| F01D 25/16 | (2006.01) |
| F01D 25/18 | (2006.01) |
| F16C 33/66 | (2006.01) |
| F16N 7/16 | (2006.01) |
| F16N 7/32 | (2006.01) |
| F16N 7/36 | (2006.01) |
| F02M 63/00 | (2006.01) |

(Continued)

(52) U.S. Cl.
CPC ................ *F02C 7/06* (2013.01); *F01D 9/065* (2013.01); *F01D 25/16* (2013.01); *F01D 25/18* (2013.01); *F01D 25/20* (2013.01); *F02M 63/0001* (2013.01); *F16C 33/6659* (2013.01); *F16N 7/16* (2013.01); *F16N 7/32* (2013.01); *F16N 7/363* (2013.01); *F05D 2220/32* (2013.01); *F05D 2260/60* (2013.01); *F05D 2260/98* (2013.01); *F16C 2360/23* (2013.01); *F16N 2210/02* (2013.01); *F16N 2210/14* (2013.01)

(58) Field of Classification Search
CPC ... F16N 7/16; F16N 7/32; F16N 7/363; F02C 7/06; F01D 9/065; F01D 25/16; F01D 25/18; F01D 25/20; F02M 63/0001; F16C 33/6659
See application file for complete search history.

(56) References Cited

U.S. PATENT DOCUMENTS

| 468,485 A | 2/1892 | Sagendorph |
|---|---|---|
| 4,648,485 A | 3/1987 | Kovaleski |

(Continued)

FOREIGN PATENT DOCUMENTS

| EP | 2 154 337 A2 | 2/2010 |
|---|---|---|
| JP | 2000-249151 A | 9/2000 |

OTHER PUBLICATIONS

May 6, 2015 Search Report issued in British Application No. GB1419770.1.

(Continued)

*Primary Examiner* — William E Dondero
*Assistant Examiner* — Mark K Buse
(74) *Attorney, Agent, or Firm* — Oliff PLC

(57) ABSTRACT

Described is an oil distributor comprising: an oil distribution conduit having an inlet end and an outlet; an oil delivery arrangement at the outlet of the oil distribution conduit, the oil delivery arrangement including a circumferential channel having a base, an upstream wall and a downstream delivery wall, wherein the delivery wall includes a plurality of circumferentially distributed delivery apertures extending therethrough.

15 Claims, 3 Drawing Sheets

(51) Int. Cl.
  *F01D 9/06* (2006.01)
  *F01D 25/20* (2006.01)

(56) References Cited

U.S. PATENT DOCUMENTS

| | | | | |
|---|---|---|---|---|
| 4,693,672 | A * | 9/1987 | Carvalho | F01D 25/18 184/6.11 |
| 6,409,464 | B1 | 6/2002 | Fisher et al. | |
| 7,455,150 | B1 * | 11/2008 | Gekht | F01D 25/16 184/11.2 |
| 7,699,530 | B2 * | 4/2010 | Blais | F01D 25/18 184/11.2 |
| 8,016,554 | B2 * | 9/2011 | Ward | F01D 25/16 415/175 |
| 8,997,487 | B2 * | 4/2015 | Drangel | F02B 39/005 417/407 |
| 2003/0039421 | A1 | 2/2003 | Fisher et al. | |
| 2005/0244272 | A1 | 11/2005 | Bruno et al. | |
| 2006/0213726 | A1 * | 9/2006 | Gekht | F01D 25/16 184/11.4 |
| 2008/0050061 | A1 | 2/2008 | Lefebvre et al. | |
| 2009/0294216 | A1 * | 12/2009 | Begin | F01D 25/18 184/6.11 |
| 2014/0241851 | A1 | 8/2014 | Demitraszek et al. | |
| 2015/0337681 | A1 * | 11/2015 | Scott | F01D 9/065 415/111 |
| 2016/0003100 | A1 * | 1/2016 | Walker | F01D 25/16 415/116 |
| 2016/0025140 | A1 * | 1/2016 | Walker | F16C 19/06 384/475 |

OTHER PUBLICATIONS

Mar. 24, 2016 Extended Search Report issued in European Patent Application No. 15191641.8.

* cited by examiner

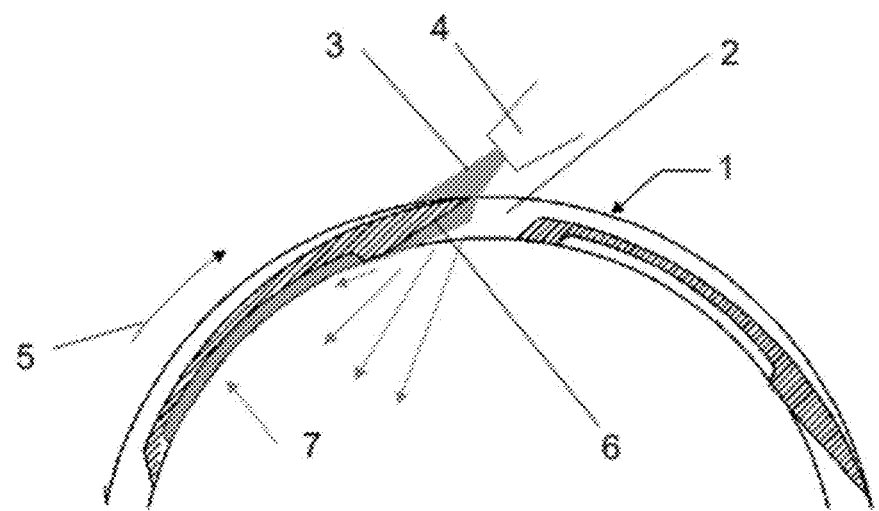
PRIOR ART      Fig. 1a
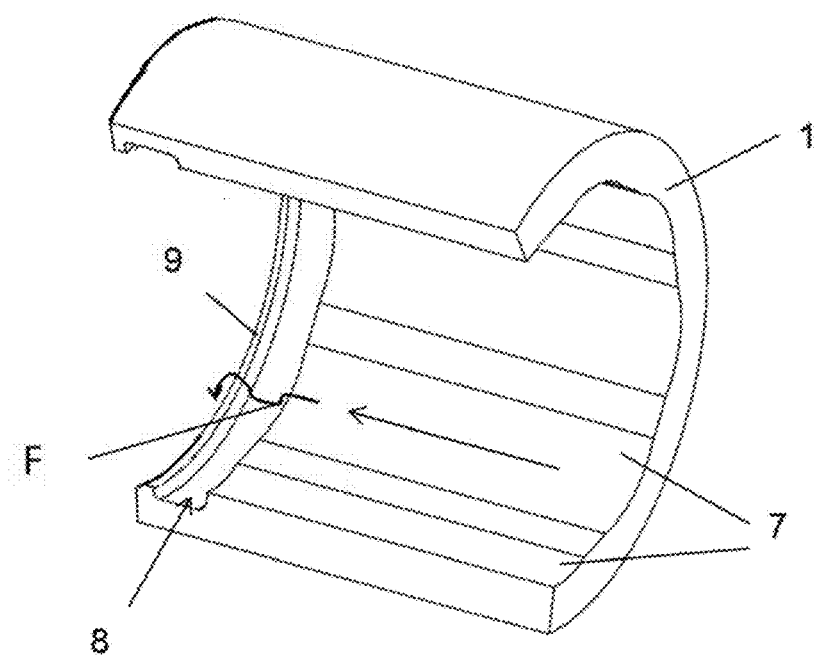
PRIOR ART      Fig. 1b

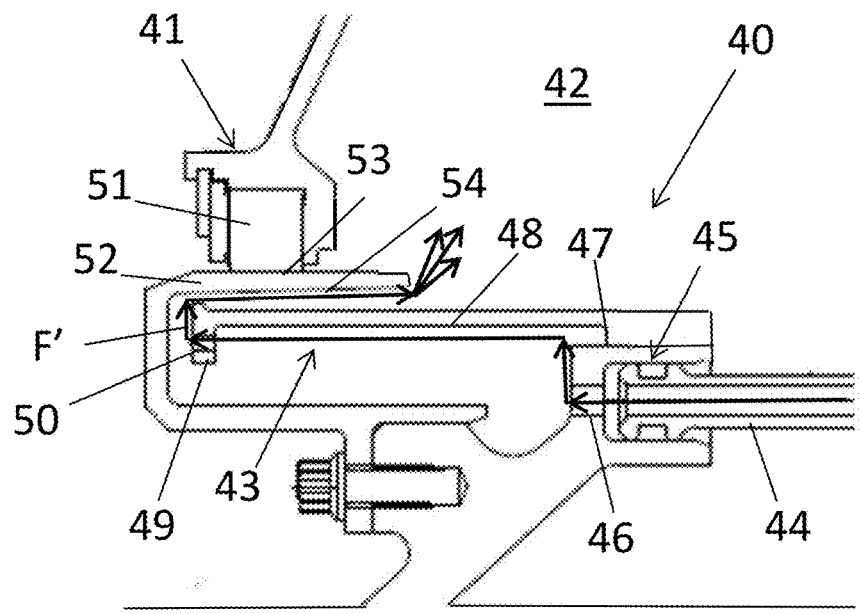
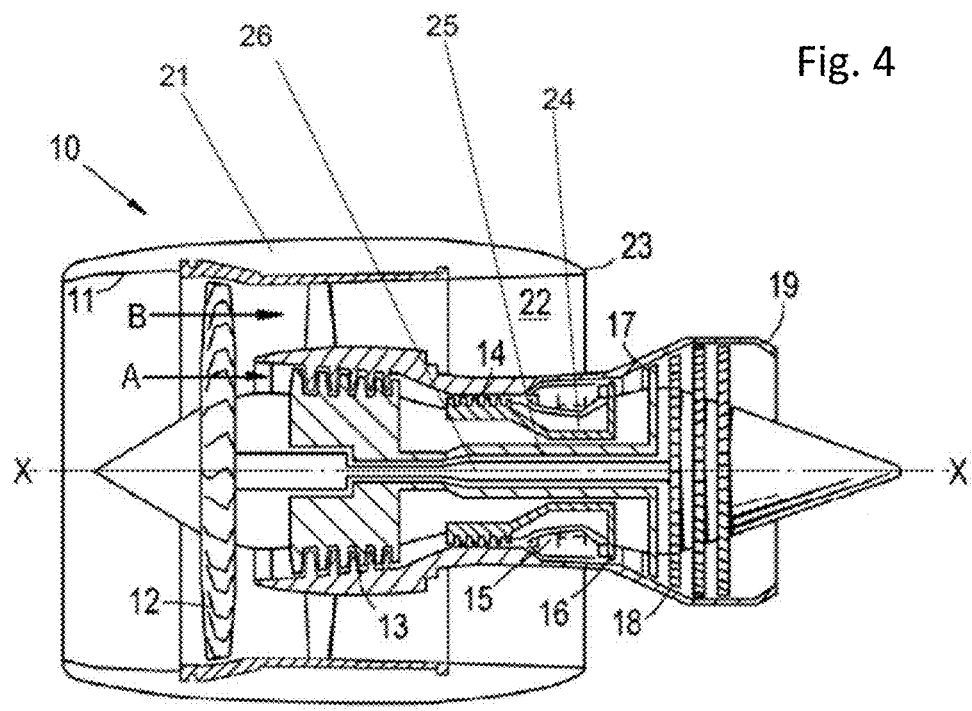
Fig. 4
Fig. 2

OIL DISTRIBUTOR

The present invention relates to an oil distributor, more particularly, an oil distributor which is used for providing a flow of oil for cooling or lubrication purposes within.

It is known to provide gas turbine engines with liquid-capturing shafts, also known as scoop rotor feeds, to capture lubricating and cooling oil and direct it to one or more sites within the shaft requiring lubrication and cooling, such as bearings. For example, it is common to provide such arrangements on the shafts of multi-shaft engines, in order to capture and direct oil.

Having regard to FIGS. 1a and 1b, a conventional liquid-capturing shaft 1 of this general type has a series of circumferentially spaced through-slots 2 that are designed to catch oil 3 from an externally jetted source 4. The slots 2 are offset from the shaft axis such that, during rotation of the shaft 1 (as indicated by arrow 5) they present an inwardly directed angled surface 6 to a column of oil which is directed towards the shaft from an external oil jet. These devices utilise the inertia of the oil to generate high levels of slip on impact with the surfaces 6 such that the oil is forced inside the shaft before it picks up sufficient rotational speed for centrifugal forces to dominate and drive the oil outwardly against the inner surface of the shaft.

FIG. 1b, shows a portion of the shaft 1 axially downstream of the inlet slots. The inner surface of the shaft 1 here includes oil distribution channels 7 in the form of scallops along which oil can flow once captured against the inner surface. The scallops extend axially along the shaft 1 and terminate open endedly into a circumferential channel 8. The circumferential channel 8 includes a base, an upstream wall and a downstream wall.

The upstream wall of the circumferential channel 8 axially opposes the oil distribution channels 7 and provides a delivery wall 9 with a radial height similar to the radial depth of the oil distribution channels 7 and represents the end of the shaft 1 and a delivery point for the oil.

The circumferential channel 8 is radially deeper than the oil distribution channels 7. The combination of the circumferential channel 8 and delivery wall 9 provide a weir feature in which the oil can collect and be circumferentially redistributed prior to spilling out over the wall and being ejected radially outwardly under the centrifugal load. Such a flow of oil is indicated by the arrow F.

It is an object of the present invention to provide an improved oil distributor.

According to the present invention, there is provided an oil distributor according to the appended claims.

The oil distributor comprises: an oil distribution conduit having an inlet end and an outlet; an oil delivery arrangement at the outlet of the oil distribution conduit, the oil delivery arrangement including a circumferential channel having a base, an upstream wall and a downstream delivery wall, wherein the delivery wall includes a plurality of circumferentially distributed delivery apertures extending therethrough.

The delivery wall may be the downstream wall. Alternatively or additionally, the delivery apertures may be located in the base.

The base of the circumferential channel may be radially outwards of the oil distribution conduit outlet. The delivery apertures may be located radially outwards of the outlet.

The number of delivery apertures may be greater than the number of distribution conduits.

The oil distribution conduit may be provided by one or more circumferentially distributed axially extending channels on a radially inner surface of a cylindrical shaft wall.

The inner radial limit of the delivery wall may be radially inwards of the inner surface of the cylindrical wall. Alternatively, the oil delivery conduit may be an elongate tube.

The oil distribution conduit outlet may be axially located along a mid-portion of the circumferential channel.

The delivery apertures may be located radially inboard and upstream of an oil cooled platform.

The oil cooled platform may form part of a sealing arrangement. The oil cooled platform may have an annular wall with opposing radially inner oil cooled surface and radially outboard sealing surface for sealing interaction with a seal. The seal may be a contacting carbon seal.

In a further aspect, the invention may provide a bearing chamber comprising the oil delivery system of the prior recited aspect or embodiments.

In yet a further aspect, the invention may provide a gas turbine engine comprising the oil distributor of the prior recited aspects or embodiments.

The gas turbine engine may comprise: an oil distributor having: an oil distribution conduit having an inlet end and an outlet; an oil delivery arrangement at the outlet of the oil distribution conduit, the oil delivery arrangement including a circumferential channel having a base, an upstream wall and a downstream delivery wall, wherein the delivery wall includes a plurality of circumferentially distributed delivery apertures extending there through. The gas turbine may further comprise a seal.

So that the invention may be more readily understood, and so that further features thereof may be appreciated, embodiments of the invention will now be described by way of example with reference to the accompanying drawings in which:

FIG. 1a (discussed above) is a transverse cross sectional view through part of a prior art liquid-capturing shaft;

FIG. 1b is a perspective cut away view of the shaft of FIG. 1;

FIG. 2 is a schematic longitudinal axial view through a gas turbine engine of a type in which the present invention may be provided;

FIG. 3b is a perspective cut away view of the shaft shown in FIG. 3a.

FIG. 4 shows an alternative oil distribution system.

Figure 3A:
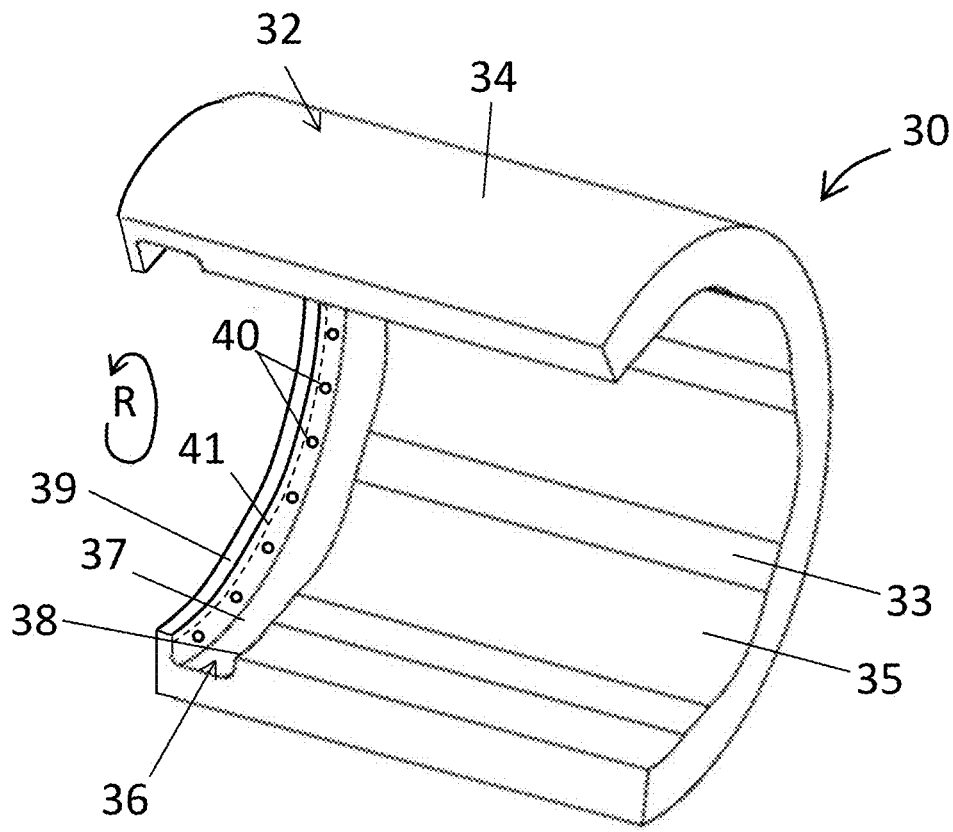
FIG. 3a is a longitudinal cross-sectional view through part the oil distributor liquid-capturing shaft in accordance with the present invention.

Turning now to consider the drawings in more detail, FIG. 2 illustrates a ducted fan gas turbine engine 10 of a type which may incorporate the invention and which has a principal and rotational axis X-X. The engine comprises, in axial flow series; an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 via respective interconnecting shafts 24, 25, 26 which are arranged concentrically.

As will therefore be appreciated, the shafts 24, 25, 26 are arranged for rotation relative to one another during operation of the engine. Bearings are provided in sealed oil chambers along the length of the shafts, and between radially adjacent shafts. The bearings require a supply of cooling and lubricating oil, and so there must be provided an arrangement to direct oil inside a shaft 1 and to the bearings therein during rotation of the shaft 1. The bearings may thus be considered to represent targets for the oil which is generally directed against the outside of a respective shaft 1 from one or more jets 4 arranged around the shaft 1 as indicated generally in FIG. 1 and discussed above.

The oil chambers generally include seals which allow the bearing chamber to accommodate the rotation of the shaft 1 which is located within the bearing oil chamber. The seals used for sealing the bearing oil chamber can vary, but in the case of a contacting seal, such as a carbon seal, there can be a need to provide a distributed flow of cooling oil around the circumference of the seal to prevent differential heating and distortion around the sealing interface.

With the weir systems of the prior art, it has been discovered that the delivery of oil is sensitive to the roundness and rotational centre of the delivery wall. Hence, any machining tolerances or operational effects on the shaft 1 which provide a degree of out-of-roundness or off-centre running in the delivery wall, affects the resultant delivery of oil.

FIG. 3 illustrates a shaft 30 embodying the invention, and which is suitable for use in the gas turbine engine 10. The shaft 30 is configured to be rotatable about its longitudinal axis as denoted by arrow R, and has a cylindrical sidewall 32 defining an inner surface 33 and an outer surface 34 of the shaft 30. A series of circumferentially spaced axially extending oil distribution channels 35 in the form of scallops are provided around the inner surface 33 of the shaft 30 for the flow of oil, similar to the flow described above in connection with FIG. 1b. A circumferential channel 36 is provided at the terminal end of the distribution channels 35 to act as a reservoir.

The circumferential channel 36 is provided by a recess in the inner surface 33 of the shaft 30 and has a base 37, an upstream side wall 38 and a delivery wall 39. The distribution channels 35 open into the upstream side wall 38 of the reservoir without restriction. The radial depth of the reservoir is significantly deeper than the distribution channels 35 such that oil can flow from the channels 35 and move radially outwards under centrifugal loading into the base 37 of the reservoir. It will be appreciated that the base 37 of the reservoir is radially outwards and is the base 37 in the sense that it is where oil is spun out to under the centrifugal loading. The relative depth of the oil distribution channels 35 and reservoir will be application specific but the circumferential channel 36 may be between 1.5 to 3 times the maximum depth of the oil distribution channels 35.

The delivery wall 39 of the invention is different to that of the equivalent wall shown in FIGS. 1a and 1b, in that it includes a plurality of outflow holes to allow oil to escape and be delivered from the reservoir prior to the level reaching the free end of the delivery wall and potential for non-uniform over-spill occurring. Thus, the outflow holes provide delivery apertures 40 in the delivery wall. The delivery apertures 40 extend axially through the delivery wall 39 from a first side which faces and bounds the reservoir, to a second side from which the oil is delivered to a radially outboard target.

The apertures 40 are uniformly distributed around the circumference of the delivery wall 39 and are of a similar sized diameter to each. The number and size of the apertures 40 will be dependent on the application but will generally be that they restrict the flow of oil through to ensure the oil level builds up to feed all apertures within the positional accuracy of the holes relative to the rotational axis of the shaft. In doing so, there is a circumferentially distributed delivery of oil which is controlled so as to not breach the radially inner surface of the delivery wall 39.

The delivery wall 39 extends normal to the shaft's axis of rotation so as to have a radial height extending from the base 37 of the circumferential channel to a radially inner free end. It is preferable to provide the delivery apertures 40 in a mid-portion which is spaced from the base 37 of the channel 36 and radial limit thereof. The spacing from the bottom of the channel 36 allows a head of oil to build up, as denoted by 41, and uniformly distribute around the channel before being exhausted. The spacing from the radial extent of the wall helps prevent the oil from being released over the top of the delivery wall when the oil flow exceeds the throughflow of the apertures 40 which may occur under some operating conditions.

To further aid the uniform flow of oil through the delivery apertures 40, the radial height of the delivery wall 39 in the described embodiment is greater than that of the radially inner surface of the oil distribution channels 35. Thus, the free end of the delivery wall 39 is radially inwards of the inner surface of the shaft 30 which vastly increases volume of oil required to breach the delivery wall 39 unintentionally. It will be appreciated that the radial height should not be excessive to avoid additional unnecessary weight to the shaft 30. In one embodiment, the delivery wall extends radially inwards of the inner surface of the shaft 30 by up to twice the depth of the oil distribution channels.

FIG. 4 shows an alternative embodiment of the invention in which the oil distribution system 40 is used to provide oil to a seal 41 for a bearing chamber 42. In this embodiment, the reservoir is provided by an annular channel 43 which is placed radially outboard of a terminal end of an oil distribution conduit in the form of an oil distribution tube 44. The oil distribution tube 44 shown may be one of a plurality of circumferentially distributed tubes 44 arranged around the principal rotational axis of the engine.

The tubes 44 are sealably received within a housing 45 which encases the end of the tube 44. The housing 45 includes an outlet 46 in an axial end wall thereof. Outboard of the housing 45 is located a reservoir channel defined by an upstream wall 47, an annular base 48 and a downstream wall 49. The annular base is radially from and axially spans the outlet 46 in the housing wall on an outboard side thereof, such that the outflow of oil from the distribution tube 44 is received within the extent of the upstream 47 and downstream 49 walls and within the reservoir.

Figure 3B:
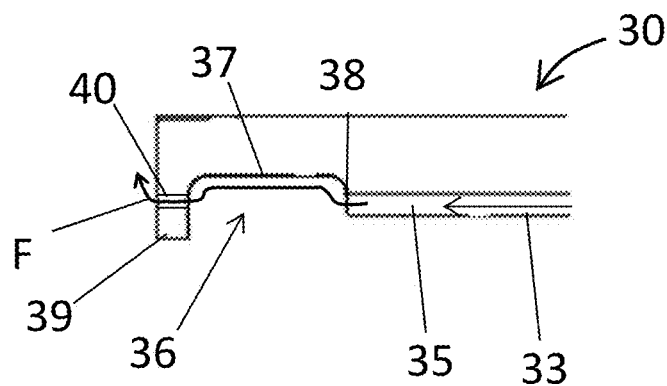

The downstream wall 49 of the reservoir is similar to the reservoir described in the embodiment of FIGS. 3a and 3b. Hence, there is a radially extending wall having a plurality of uniformly circumferentially distributed outflow holes or delivery apertures 50. It will be appreciated that because the reservoir is radially outboard of the oil distribution tubes 44 the relative radial height of the oil flows are separated and there is no longer the requirement of providing the radial overlap of the delivery walls and oil distribution conduit. However, the delivery apertures 50 are still placed within radial mid-portion of the delivery wall 49 to allow a head of oil to build within the reservoir prior to flowing out of the channel such that the oil can circumferentially redistribute. This enables the number of oil distribution tubes 44 to be independent of the number of delivery apertures 50.

The reservoir extends radially inboard of a seal 41 which is used to seal the chamber 42 in use. The seal 41 includes a stationary part 51 which interfaces with a rotating runner 52 at a sealing surface 53. There is a requirement for some sealing solutions to keep the runner 52 and sealing surface at a substantially uniform circumferential temperature to prevent out of round distortions in use.

To address this, the sealing surface 53 is provided by an annular wall having the sealing surface 53 on an outboard side and an oil cooled surface 54 on the radially inner side. The oil cooled surface is arranged to receive a flow of oil from the reservoir which provides a cooling flow over the radially inner surface.

To provide the flow of cooling oil under centrifugal forces, the delivery apertures 49 are positioned radially inwards and at an upstream region of the seal runner 52. Thus, oil flowing out of the delivery apertures 50 is deposited on and flows along the runner. The flow of oil is provided by the centrifugal momentum of the oil.

Once the oil has flowed past the seal surface it flows off the terminal end of the seal runner platform and back into the inner bearing chamber where it is recirculated in a conventional way.

In other embodiments, the delivery wall may be the base of the circumferential channel. In this case, the downstream may or may not have delivery apertures. It will be appreciated that where the delivery apertures are in the base, the oil will flow out under centrifugal loading in a similar manner, and provide many of the same advantages as the embodiments described above.

It will be appreciated that the features of the described embodiments may be interchanged or replaced where possible. Hence, for example, the oil distribution channels shown in FIGS. 3a and 3b as being on the inner surface of shaft 30 may empty into a reservoir channel as described in relation to the second embodiment shown in FIG. 4. Thus, the reservoir may not be integrally formed with the shaft 30. In such an embodiment, the oil distribution channels will terminate at the axial end of the shaft such that the oil can be spun out into the reservoir.

Whilst the invention has been described above with specific reference to embodiments configured for use in capturing oil in gas turbine engines, it is to be appreciated that the present invention is not limited to use in such arrangements, and can be embodied in shafts configured to capture other liquids and for use in other types of machines.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An oil distributor comprising:
    an oil distribution conduit having an inlet end and an outlet;
    an oil delivery arrangement at the outlet of the oil distribution conduit, the oil delivery arrangement including an open circumferential channel open in a radially inner direction, the circumferential channel having a base, an upstream wall and a downstream delivery wall,
    wherein the delivery wall includes a plurality of circumferentially distributed delivery apertures extending therethrough.

2. An oil distributor as claimed in claim 1 wherein the base of the circumferential channel is radially outwards of the oil distribution conduit outlet.

3. An oil distributor as claimed in claim 1, wherein the delivery apertures are located radially outwards of the outlet.

4. An oil distributor as claimed in claim 1 wherein the number of delivery apertures is greater than the number of distribution conduits.

5. An oil distributor as claimed in claim 1, wherein the oil distribution conduit is provided by one or more circumferentially distributed axially extending channels on the radially inner surface of a cylindrical shaft wall.

6. An oil distributor as claimed in claim 5, wherein the inner radial limit of the delivery wall is radially inwards of the inner surface of the cylindrical wall.

7. An oil distributor as claimed in claim 1, wherein the oil delivery conduit is an elongate tube.

8. An oil distributor as claimed in claim 1 wherein the oil distribution conduit outlet is axially located along a midportion of the circumferential channel.

9. An oil distributor as claimed in claim 1 wherein delivery apertures are located radially inboard and upstream of an oil cooled platform.

10. An oil distributor as claimed in claim 9 wherein the oil cooled platform forms part of a sealing arrangement, the oil cooled platform having an annular wall with opposing radially inner oil cooled surface and radially outboard sealing surface for sealing interaction with a seal.

11. An oil distributor as claimed in claim 10, wherein the seal is a contacting carbon seal.

12. A bearing chamber comprising the oil distributor as claimed in claim 1.

13. A gas turbine engine comprising the oil distributor of as claimed in claim 1.

14. An oil distributor as claimed in claim 1, wherein the downstream delivery wall has a height extending radially inward from the base.

15. An oil distributor as claimed in claim 14, wherein the plurality of circumferentially distributed delivery apertures extend through the delivery wall such that oil can escape and be delivered from the circumferential channel prior to an oil level reaching a radially inner surface of the delivery wall.

* * * * *